(12) United States Patent
Stigler et al.

(10) Patent No.: US 11,334,098 B2
(45) Date of Patent: May 17, 2022

(54) LIGHT-EMITTING COMPONENT, LAMP AND USE OF A LAMP AND A LIGHT-EMITTING COMPONENT

(71) Applicant: OSRAM OLED GmbH, Regensburg (DE)

(72) Inventors: Sebastian Stigler, Scharmassing (DE); Uli Hiller, Bad Abbach (DE); Martin Moritz, Regensburg (DE)

(73) Assignee: OSRAM OLED GMBH, Regensburg (DE)

( * ) Notice: Subject to any disclaimer, the term of this patent is extended or adjusted under 35 U.S.C. 154(b) by 80 days.

(21) Appl. No.: 16/636,589

(22) PCT Filed: Jul. 11, 2018

(86) PCT No.: PCT/EP2018/068819
§ 371 (c)(1),
(2) Date: Feb. 4, 2020

(87) PCT Pub. No.: WO2019/029937
PCT Pub. Date: Feb. 14, 2019

(65) Prior Publication Data
US 2020/0290508 A1    Sep. 17, 2020

(30) Foreign Application Priority Data
Aug. 11, 2017 (DE) .......................... 102017118339.6

(51) Int. Cl.
*B60Q 3/43* (2017.01)
*H05B 45/20* (2020.01)
*G05D 25/02* (2006.01)

(52) U.S. Cl.
CPC .............. *G05D 25/02* (2013.01); *B60Q 3/43* (2017.02); *H05B 45/20* (2020.01)

(58) Field of Classification Search
None
See application file for complete search history.

(56) References Cited

U.S. PATENT DOCUMENTS

| 6,692,136 B2 | 2/2004 | Marshall et al. |
| 9,312,435 B2 | 4/2016 | Gärtner et al. |

(Continued)

FOREIGN PATENT DOCUMENTS

| DE | 102013111662 A1 | 4/2015 |
| DE | 102015209603 A1 | 6/2016 |

(Continued)

OTHER PUBLICATIONS

Dieter Lang, "Human Centric Lighting; Daylight-Related Metrics as prerequisite for assessment of light quality and for lighting design," Seventh Framework Programme; lighting for people; Connecting Opportunities for Innovation, Oct. 13, 2016, pp. 1-25.

*Primary Examiner* — Dedei K Hammond
(74) *Attorney, Agent, or Firm* — Slater Matsil, LLP

(57) ABSTRACT

A light-emitting component is disclosed. In an embodiment a light-emitting component includes at least four light sources configured to emit light of different wavelength ranges in pairs and a control device configured to operate the light sources independently of one another in such a way that light from at least two of the light sources is mixed to form a mixed light and adjust an $m_{v,mel,D65}$ value of the mixed light, wherein the at least four light sources include a first light source configured to emit electromagnetic radiation with a dominant wavelength of at most 450 nm, a second light source configured to emit electromagnetic radiation with a dominant wavelength of at least 480 nm and at most 520 nm or a dominant wavelength of at least 455 nm and at most 470 nm, a third light source configured to emit electromagnetic radiation in a spectral range of green light, and (Continued)

a fourth light source configured to emit electromagnetic radiation in a spectral range of yellow and/or amber light.

11 Claims, 7 Drawing Sheets

(56) References Cited

U.S. PATENT DOCUMENTS

| | | |
|---|---|---|
| 2003/0063462 A1 | 4/2003 | Shimizu et al. |
| 2011/0037378 A1 | 2/2011 | Vagi et al. |
| 2011/0279015 A1 | 11/2011 | Negley et al. |
| 2013/0002157 A1 | 1/2013 | van de Ven et al. |
| 2014/0184088 A1 | 7/2014 | Lu et al. |
| 2016/0159276 A1* | 6/2016 | Thomas ................. B64D 11/00 315/77 |
| 2019/0174587 A1* | 6/2019 | Petluri ............... C09K 11/7734 |
| 2019/0192878 A1* | 6/2019 | Lang ..................... H05B 47/19 |

FOREIGN PATENT DOCUMENTS

| | | |
|---|---|---|
| JP | 2003045206 A | 2/2003 |
| JP | 2010162214 A | 7/2010 |
| KR | 20010101910 A | 11/2001 |
| KR | 20130099210 A | 9/2013 |
| WO | 2009133676 A1 | 11/2009 |
| WO | 2012167107 A1 | 12/2012 |
| WO | 2016146688 A1 | 9/2016 |
| WO | 2017131715 A1 | 8/2017 |

* cited by examiner

LIGHT-EMITTING COMPONENT, LAMP AND USE OF A LAMP AND A LIGHT-EMITTING COMPONENT

This patent application is a national phase filing under section 371 of PCT/EP2018/068819, filed Jul. 11, 2018, which claims the priority of German patent application 102017118339.6, filed Aug. 11, 2017, each of which is incorporated herein by reference in its entirety.

TECHNICAL FIELD

A light-emitting component is specified.

SUMMARY OF THE INVENTION

Embodiments provide a light-emitting component that is particularly suitable for so-called "Human Centric Lighting", in which people are at the center of lighting design.

Further embodiments provide a lamp comprising such a component and the use of such a lamp or component.

According to at least one embodiment, the light-emitting component comprises at least four light sources, which are configured to emit light of different wavelength ranges in pairs. This means that the light sources emit electromagnetic radiation, in particular visible light, when the light sources are in operation. The light emitted by the different light sources differs in pairs with regard to the wavelength ranges in which light is emitted. For example, the light sources each generate light with a certain dominant wavelength.

In color theory, the dominant wavelength represents a possibility to describe non-spectral (polychromatic) light mixtures by spectral (monochromatic) light which produces a similar color perception.

In the CIE color space, the line connecting a point for a specific color and the point for the color of the light source can be extrapolated to meet the outline of the space in two points. The intersection point closer to said color represents the dominant wavelength of the color as the wavelength of the pure spectral color at that intersection point. The dominant wavelengths of the different light sources are different in pairs. For example, the difference of the dominant wavelength for the light from two of the light sources is at least 15 nm. In particular, it is possible that at least three of the light sources emit light of different color in pairs.

The light sources may be optoelectronic components such as light-emitting diodes, organic light-emitting diodes and/or laser diodes. In particular, the light sources may also be light-emitting diode chips which are free of a converter or which comprise a converter which converts at least part of the primary radiation generated in a semiconductor body of the light-emitting diode chip into a secondary radiation which is more low-energetic than the primary radiation.

According to at least one embodiment of the light-emitting component, the light-emitting component comprises a control device for operating the light sources. The control device may, for example, be at least one switch which can be used to control the operation of the light sources. In addition, the control device may be a microcontroller or an integrated circuit. The control device is configured to operate the light sources independently of one another in such a way that the light from at least two of the light sources is mixed to form a mixed light.

This means that the light sources can be operated by the control device at different times, for different periods and/or with different current intensities, for example. It is possible that at least two of the light sources are operated in such a way that a mixed light of the light of these light sources is emitted by the light-emitting component. This can be achieved, for example, by operating the at least two light sources simultaneously or by operating the at least two light sources in rapid succession so that the light emitted by the light sources also mixes into a mixed light for the human observer. For this purpose, the control device may, for example, comprise or be connected to at least one pulse width modulation circuit.

The mixed light may in particular be white light.

According to at least one embodiment of the light-emitting component, the control device is configured to adjust the $m_{v,mel,D65}$ value of the mixed light. The $m_{v,mel,D65}$ value is the melanopic daylight equivalent efficiency factor. For the mixed light it is determined from the quotient of the melanopic daylight equivalent luminous flux of standard light $D_{65}$ (natural daylight) and the photo-optical luminous flux according to the eye sensitivity curve $V(\lambda)$ of the mixed light. The factor can be used to calculate the corresponding melanopic daylight equivalent luminous flux for a light source with a photo-optical luminous flux. The higher the $m_{v,mel,D65}$ value, the higher the stimulation by the light and the lower the melanopsin production in a person who is irradiated by the light.

With the control device it is possible to adjust the $m_{v,mel,D65}$ value of the mixed light. This can mean, for example, that the control device can be used to select the $m_{v,mel,D65}$ value of the mixed light from at least two predefinable values. It is also possible that the $m_{v,mel,D65}$ value can be selected from more than two, for example from ten predefined values by means of the control device. In addition, it is possible that the control device is configured to change the $m_{v,mel,D65}$ value of the mixed light quasi-continuously by controlling the light sources.

According to at least one embodiment of the light-emitting component, a component is specified comprising at least four light sources configured to emit light of different wavelength ranges in pairs, and a control device for operating the light sources, wherein the control device is configured to operate the light sources independently of one another in such a way that the light from at least two of the light sources is mixed to form a mixed light, and the control device is adapted to adjust the $m_{v,mel,D65}$ value of the mixed light.

It is possible to adjust the $m_{v,mel,D65}$ value of the mixed light with a light-emitting component described here. This makes it possible to specifically influence the release of melanopsin by stimulating the human eye via the mixed light of the light-emitting component so that, for example, lighting can be provided that produces as little melanopsin as possible if increased mental concentration is desired. Furthermore, the same light-emitting component can be used to generate mixed light which stimulates a high melanopsin production and thus ensures reduced stimulation, for example in relaxation and rest phases.

According to at least one embodiment of the light-emitting component, the at least four light sources comprise a first light source configured to emit electromagnetic radiation having a dominant wavelength of at least 420 nm and at most 450 nm. For example, the first light source emits during operation electromagnetic radiation with a dominant wavelength of 445 nm. In other words, the first light source produces light in the deep blue region of the spectrum.

The light-emitting component is based, among other things, on the knowledge that a maximum of the melanopic sensitivity curves $S_{mel(\lambda)}$, cf. DIN SPEC 5031-100, lies at a wavelength of 490 nm and that this deep blue light therefore produces a low stimulation of melanopsin production. The first light source is therefore particularly suitable for producing mixed light with a small $m_{v,mel,D65}$ value, which has a stimulating effect due to the reduced melanopsin production.

The first light source can in particular be a light-emitting diode or a light-emitting diode chip that is free of a converter. This means, for example, that the light from the first light source is generated directly in a semiconductor body without further conversion by a converter arranged downstream of the semiconductor body.

According to at least one embodiment of the light-emitting component, the light-emitting component comprises a second light source as one of the at least four light sources, said second light source being configured to emit electromagnetic radiation having a dominant wavelength greater than the dominant wavelength of the electromagnetic radiation of the first light source. For example, the second light source has a dominant wavelength of at least 480 nm and at most 520 nm or of at least 455 nm and at most 480 nm. This means that the second light source emits light in the blue-green (also verde) or blue spectral range during operation.

The second light source can in particular be a light-emitting diode or a light-emitting diode chip that is free of a converter. This means, for example, that the light from the second light source is generated directly in a semiconductor body without further conversion by a converter arranged downstream of the semiconductor body.

According to at least one embodiment of the light-emitting component, the light-emitting component comprises a third light source configured to emit electromagnetic radiation in the spectral range of green light.

The third light source, for example, is a light source comprising at least one light-emitting diode chip. For example, the light-emitting diode chip comprises a semiconductor body with a converter arranged downstream of the same. For example, a large part of the electromagnetic radiation generated by the light-emitting diode chip during operation, which can for example be UV radiation and/or blue light, is converted by the converter to the green light of the third light source. For example, a phosphor with the designation (phosphor code) GI2 can be used in the converter. Alternatively, it is possible to generate the green light directly without the use of a converter.

According to at least one embodiment of the light-emitting component, the at least four light sources comprise a fourth light source configured to emit electromagnetic radiation in the spectral range of yellow light and/or the at least four light sources comprise a fourth light source configured to emit electromagnetic radiation in the spectral range of amber light. In particular, it is also possible that the light-emitting component comprises two fourth light sources, one emitting yellow light and the other amber light. The fourth light source may also include a converter designed to produce the corresponding colored light.

For the generation of amber light, a phosphor with the designation (phosphor code) Amber RE314 and/or Red RE4 can be used in the converter, for example. To generate yellow light, a phosphor with the designation (phosphor code) Yellow YI12RI5 can be used in the converter, for example.

Alternatively, it is possible to generate the yellow and/or amber light directly without the use of a converter.

According to at least one embodiment of the light-emitting component, the control device is configured to vary the $m_{v,mel,D65}$ value of the mixed light in a predefinable range, wherein the color temperature of the mixed light at different $m_{v,mel,D65}$ values from the predefinable range varies by at most 20% around an average value. In particular, it is possible that the color temperature of the mixed light at different $m_{v,mel,D65}$ values from the predefinable range varies by no more than 15% or by no more than 5% around an average value. The color temperature for the different $m_{v,mel,D65}$ values can also remain the same. In particular, the change in the color temperature is not perceptible to the human observer when different $m_{v,mel,D65}$ values from the predefinable range are set.

The predefinable range of the $m_{v,mel,D65}$ value can, for example, be at least 0.1, in particular at least 0.12 or more.

A light-emitting component described here is based, among other things, on the knowledge that, for example, the $m_{v,mel,D65}$ value of the light produced can be influenced particularly well by using the first light source and the second light source, which emit mutually different blue light. It is possible to compensate for the change in color temperature due to the use of the first and second light sources with different luminous fluxes for different $m_{v,mel,D65}$ values by operating the third and fourth light sources. In this way it is possible to keep the color temperature constant or almost constant when the $m_{v,mel,D65}$ value changes.

For example, it is possible to achieve a lowest $m_{v,mel,D65}$ value of 0.54 and a highest $m_{v,mel,D65}$ value of 0.68 at a mixed light color temperature of 4000 K, which corresponds to a dynamic factor of 1.25 from activating light to relaxing light at the same white light color temperature.

This means that without the human observer being able to notice any difference in the color temperature of the white mixed light produced, it is surprisingly possible to set very different $m_{v,mel,D65}$ values of the mixed light with a light-emitting component described here. A high $m_{v,mel,D65}$ value is therefore not necessarily associated with the generation of cold white light and a low $m_{v,mel,D65}$ value is not necessarily associated with the generation of warm white light, but it is possible to achieve different $m_{v,mel,D65}$ values at a constant color temperature, for example for neutral white light.

In particular, a light-emitting component described here allows mixed light of different $m_{v,mel,D65}$ values to be produced, wherein the color temperature of the mixed light produced changes as little as possible for different $m_{v,mel,D65}$ values.

According to at least one embodiment of the light-emitting component, in order to generate mixed light with a higher $m_{v,mel,D65}$ value, the first light source is operated with a lower power in comparison to the second light source than for a lower $m_{v,mel,D65}$ value. In particular, it is possible that the first light source is not operated and the second light source is operated to produce the mixed light with the higher $m_{v,mel,D65}$ value, and the second light source is not operated and the first light source is operated to produce the mixed light with the lower $m_{v,mel,D65}$ value. In this way, the setting of two extreme $m_{v,mel,D65}$ values, for example, a smallest $m_{v,mel,D65}$ value and a largest $m_{v,mel,D65}$ value, is particularly easy by operating the first or second light source. The color temperature of the mixed light can then be changed by adjusting the third and/or fourth light source. In particular, a second light source is used which emits blue light, particularly in a wavelength range of at least 455 nm and at most 480 nm.

According to at least one embodiment of the light-emitting component, in order to generate mixed light with a higher $m_{v,mel,D65}$ value, the third light source is operated with a lower power in comparison to the second light source than for a lower $m_{v,mel,D65}$ value. In particular, it is possible that the third light source is not operated and the second light source is operated to produce the mixed light with the higher $m_{v,mel,D65}$ value, and the second light source is not operated and the third light source is operated to produce the mixed light with the lower $m_{v,mel,D65}$ value. In this way, the setting of two extreme $m_{v,mel,D65}$ values, for example, a smallest $m_{v,mel,D65}$ value and a largest $m_{v,mel,D65}$ value, is particularly easy by operating the third or second light source. The color temperature of the mixed light can then be changed by adjusting the first and/or fourth light source. In particular, a second light source is used which emits blue-green light, particularly in a wavelength range of at least 480 nm and at most 505 nm.

According to at least one embodiment of the light-emitting component, the luminous flux of the mixed light is at least 500 lm, in particular at least 750 lm or at least 1000 lm. This means that the light-emitting component can generate mixed light with a luminous flux of at least 500 lm during operation. It has been shown that light with such a high luminous flux is particularly well suitable for melanopic influence.

Furthermore, a lamp is specified. The lamp includes at least one light-emitting component described here, so that all the features described for the light-emitting component are also described for the lamp and vice versa. The lamp is in particular configured to emit light with a luminous flux of at least 500 lm, in particular at least 750 lm or at least 1000 lm. The light may consist of mixed light from two or more of the light-emitting components of the lamp, so that the individual components need not be configured to produce mixed light with a luminous flux of at least 500 lm.

Furthermore, the use of a lamp described here and of a light-emitting component described here is specified. This means that all the features disclosed for the lamp and the light-emitting component are also disclosed for the use and vice versa. A lamp or component described here can be used in particular for general lighting or for lighting the interior of a means of transport. The means of transport may be, for example, a motor vehicle, a bus, a railway wagon, an aircraft, a boat, a submarine, a helicopter or the like.

The lamp is suitable, for example, for use in a working environment where the lamp can be operated with a high $m_{v,mel,D65}$ value if special concentration is required. During rest breaks or relaxation phases it is possible to operate the lamp with the lowest possible $m_{v,mel,D65}$ value. The same applies to the operation of the lamp in a means of transport. For example, when the lamp is used in an aircraft, it is possible to mitigate the negative consequences of a time shift (jet lag) by operating the lamp accordingly. For example, the $m_{v,mel,D65}$ value of the light produced by the lamp can be gradually adjusted over the flight time to the $m_{v,mel,D65}$ value of the daylight at the destination. The course of daylight can be simulated as general lighting. This can increase well-being, improve sleep at night and improve performance during the day.

BRIEF DESCRIPTION OF THE DRAWINGS

In the following, the light-emitting component described here as well as the lamp described here and the use of the light-emitting component and the lamp are explained in more detail by means of exemplary embodiments and the corresponding figures.

Identical, similar or equivalent elements are provided with the same reference signs in the figures. The figures and the proportions of the elements depicted in the figures are not to be regarded as true to scale. Rather, individual elements may be represented exaggeratedly large for better representability and/or better comprehensibility.

DETAILED DESCRIPTION OF ILLUSTRATIVE EMBODIMENTS

Figure 1A:
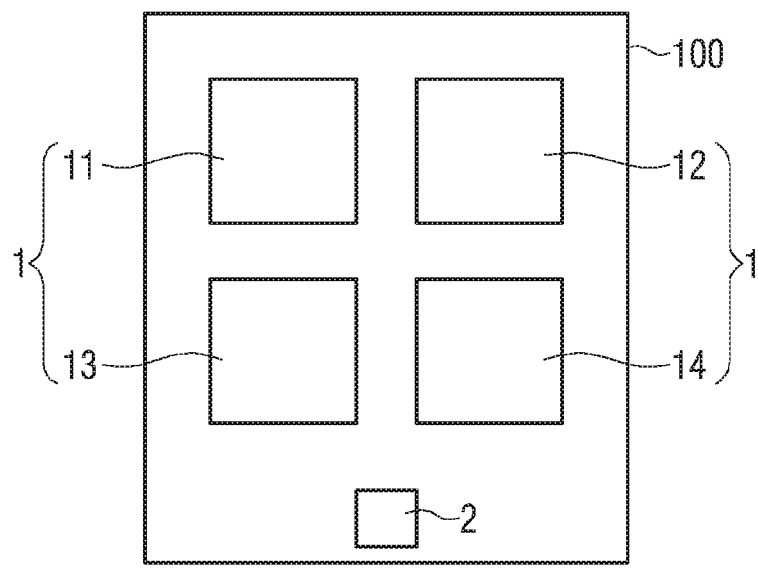
FIGS. 1A and 1B show schematic illustrations of exemplary embodiments of light-emitting components.

FIG. 1A shows a schematic top view of an exemplary embodiment of a light-emitting component 100 described here. The light-emitting component 100 comprises four light sources 1 with a first light source 11, a second light source 12, a third light source 13 and a fourth light source 14.

The first light source 11 generates during operation electromagnetic radiation with a dominant wavelength of at most 450 nm, for example 445 nm.

The second light source 12 generates during operation electromagnetic radiation with a dominant wavelength that is greater than the dominant wavelength of the electromagnetic radiation of the first light source 11. For example, the second light source generates electromagnetic radiation with a dominant wavelength of at least 480 nm and at most 505 nm or electromagnetic radiation with a dominant wavelength of at least 455 nm and at most 470 nm.

The third light source 13 generates green light during operation. The fourth light source 14 generates yellow and/or amber light during operation.

The light-emitting component 100 of the exemplary embodiment of FIG. 1A further comprises a control device 2, which is configured to operate the light sources 1 independently of one another in such a way that the light from at least two of the light sources 1 is mixed to form a mixed light. The mixed light is generated by additive light mixing.

By using at least four light sources which emit light with different wavelength ranges in pairs during operation, a particularly large dynamic is made possible, i.e., white mixed light in particular can be produced from a large color temperature range. It has been shown that the stimulation of melanopsin production can be varied by using two different light sources, each producing blue light, the first light source and the second light source.

This is made possible by the fact that the control device 2 is configured to operate the light sources 1 independently of one another in such a way that the light from at least two of the light sources is mixed to form a mixed light, the $m_{v,mel,D65}$ value of which is adjustable by means of the control device.

The control device 2 can be located within the light-emitting component, for example, on a carrier or in a housing. In addition, it is possible that the control device 2 is located remote from the light sources.

Figure 1B:
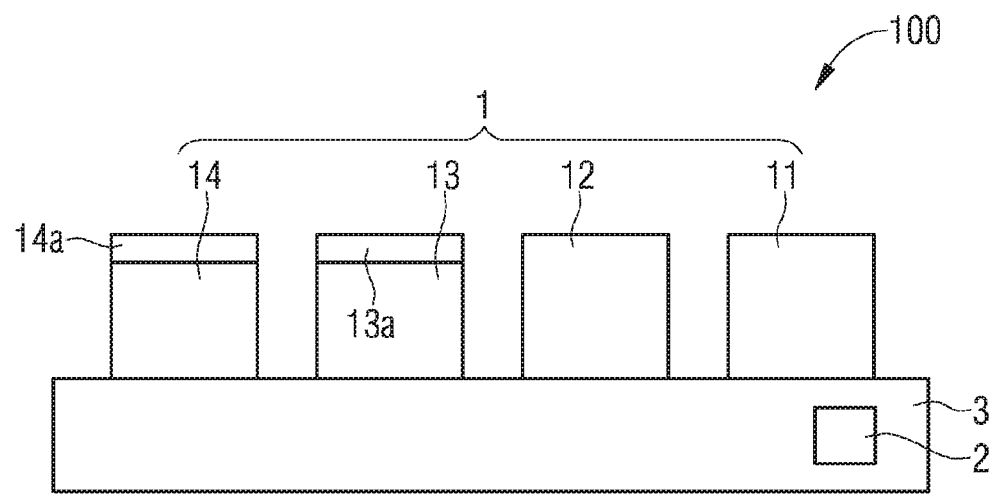

The sectional view of FIG. 1B illustrates another exemplary embodiment of a light-emitting component 100 described here. In this exemplary embodiment it is shown that the light sources 1 can be light-emitting diodes. The third light source 13 comprises a semiconductor body followed by a first converter 13a. Electromagnetic radiation generated in the semiconductor body is converted into green light by the converter 13a, for example.

The fourth light source 14 comprises a semiconductor body with a second converter 14a, whereby yellow or amber light is emitted from the fourth light source 14.

The control device 2 can, for example, be integrated into a housing 3 of the light-emitting component. For example, the control device is then an integrated circuit or a microprocessor. The housing 3 can be, for example, a connection board, a printed circuit board and/or a component housing, which can be formed, for example, with a ceramic or plastic material.

Figure 2A:
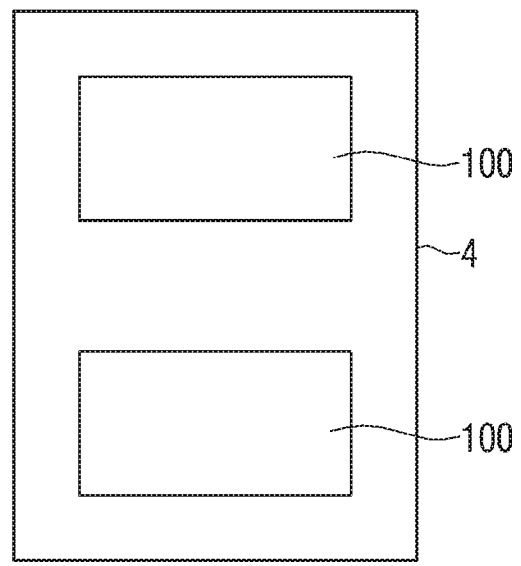
FIGS. 2A and 2B show schematic illustrations of exemplary embodiments of lamps.
Figure 2B:
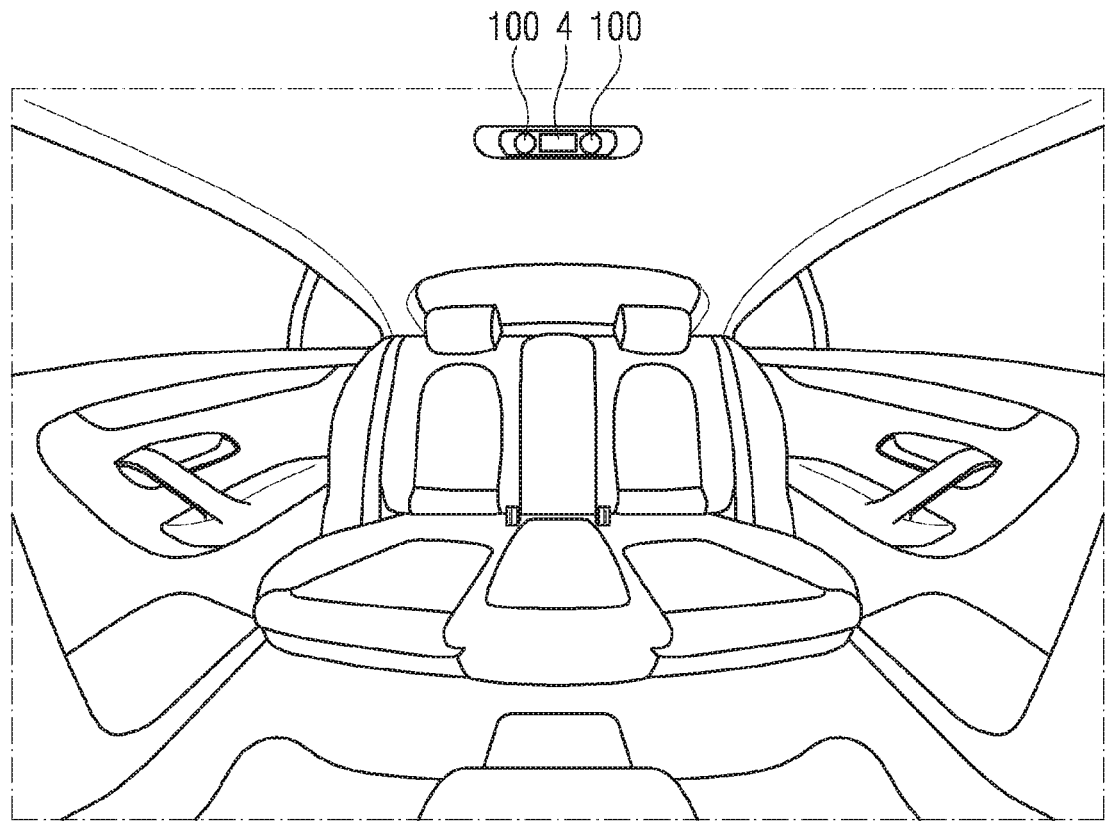

FIG. 2A shows a schematic representation of a lamp described here with two of the light-emitting components 100 described here. The lamp can be used, for example, for general lighting or interior lighting in a means of transport such as a motor vehicle. This is shown schematically in FIG. 2B.

Figure 3A:
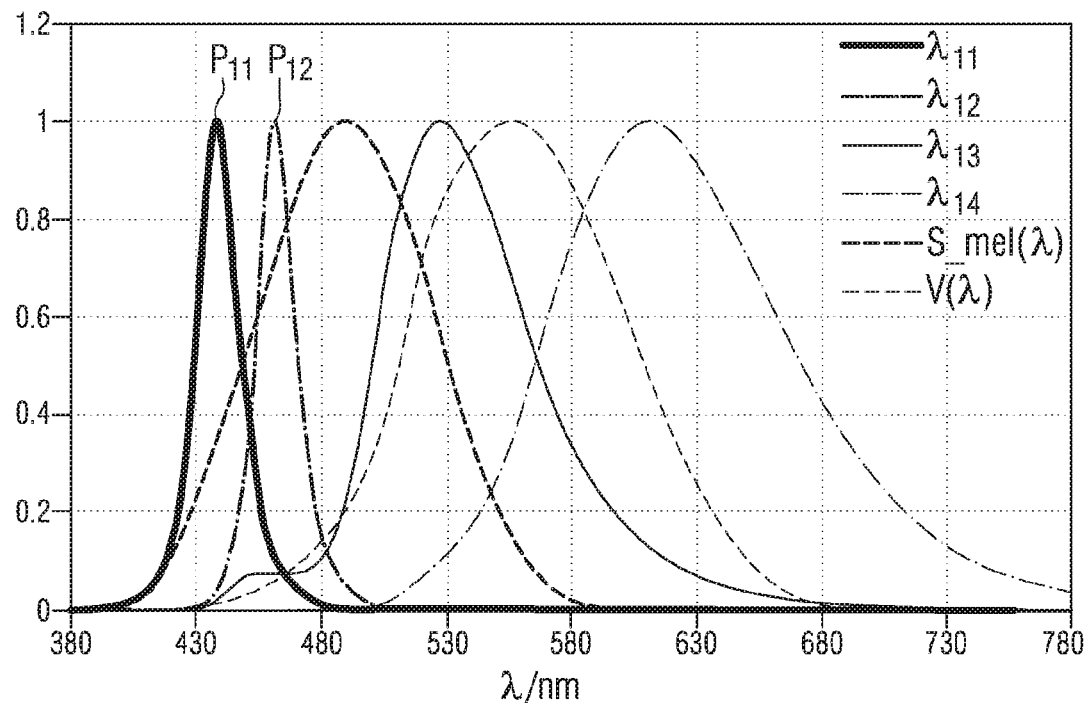
FIGS. 3A, 3B, 3C, 3D, 4A, 4B, 5A, 5B, 6A and 6B provide a more detailed illustration of exemplary embodiments of light-emitting components and lamps.

The graphic application of FIG. 3A shows the spectrum of the light sources 1 for an exemplary embodiment of a light-emitting component described here. The normalized intensity of the light generated by each light source is plotted against the wavelength λ in nm. The curve λ11 shows the light generated by the first light source with a dominant wavelength $P_{11}$. The dominant wavelength $P_{11}$, for example, is in the short-wave blue range at about 445 nm.

Curve $λ_{12}$ with a dominant wavelength $P_{12}$ shows that of the second light source, where the dominant wavelength $P_{12}$ is, for example, at 465 nm.

The light-emitting component further comprises a third light source that emits green light with the wavelength $λ_{13}$ and a fourth light source that emits light with the wavelength $λ_{14}$.

FIG. 3A also shows the $S_{mel(λ)}$ curve and the eye sensitivity curve V(λ). It can be seen that the short-wave blue light of the curve λ11 lies outside the stimulation curve $S_{mel(λ)}$. The long-wave blue light of the curve $λ_{12}$ is close to the maximum of the stimulation curve $S_{mel(λ)}$. This allows, by different control of the first and the second light sources 11, 12, the generation of mixed light with a different $m_{v,mel,D65}$ value. This in turn allows different levels of melanopsin stimulation without changing the brightness and white point of the mixed light of the light-emitting component produced by additive mixing.

Figure 3B:
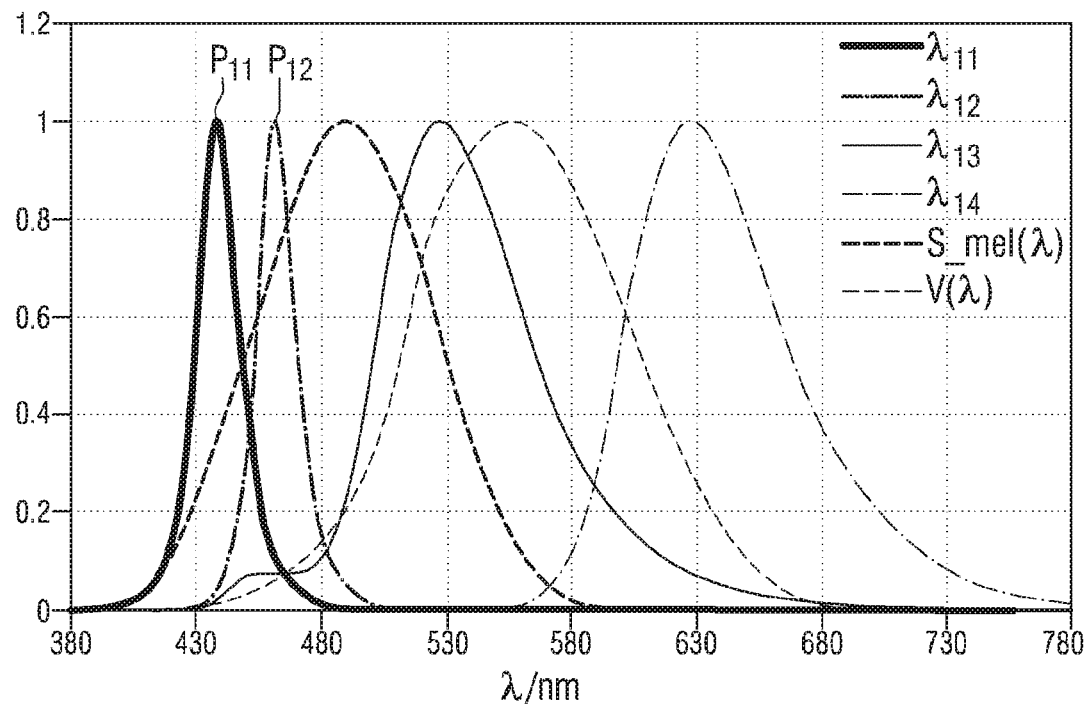

FIG. 3B illustrates a light-emitting component in which, unlike the light-emitting component in FIG. 3A, the fourth light source, marked by the curve $λ_{14}$, is a light source which emits amber light.

Figure 3C:
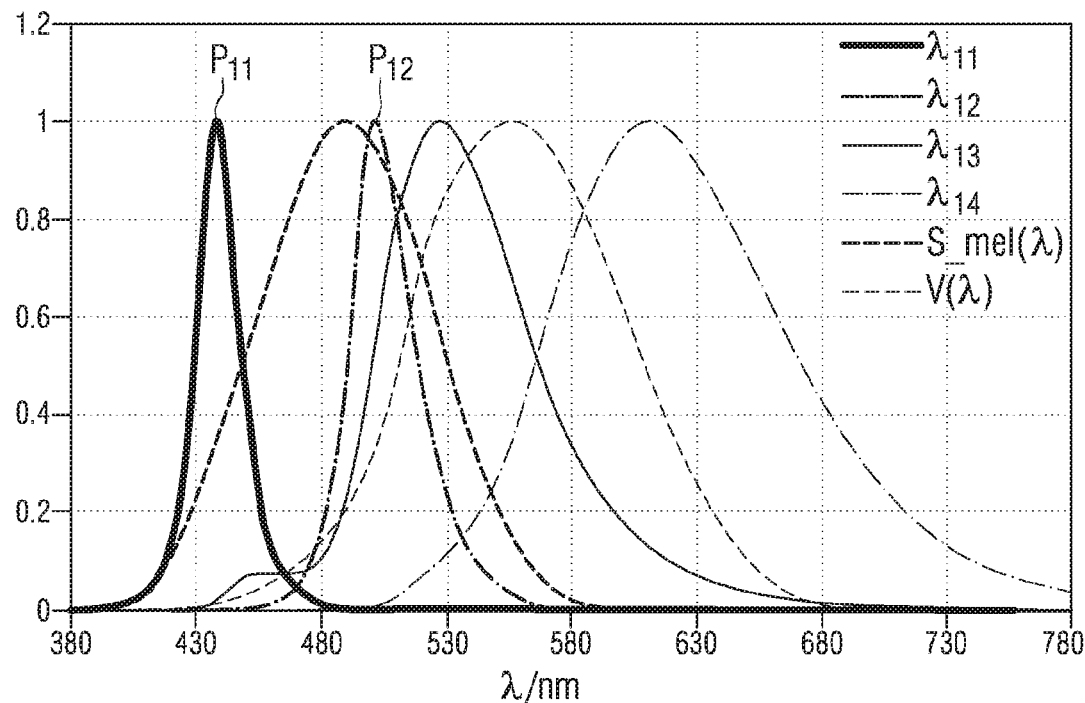

In contrast to the light source in FIG. 3A, FIG. 3C describes a light-emitting component in which the second light source, marked by the curve $λ_{12}$, emits blue-green light (also called verde), which has a dominant wavelength $P_{12}$ of 505 nm. It can be seen that the long-wave green light of the curve $λ_{13}$ lies outside the stimulation curve $S_{mel(λ)}$. The shorter wavelength blue-green light of the curve $λ_{12}$ is close to the maximum of the stimulation curve $S_{mel(λ)}$. This allows, by different control of the third and the second light sources 13, 12, the generation of mixed light with a different $m_{v,mel,D65}$ value. This in turn allows different levels of melanopsin stimulation without changing the brightness and white point of the mixed light of the light-emitting component produced by additive mixing.

Figure 3D:
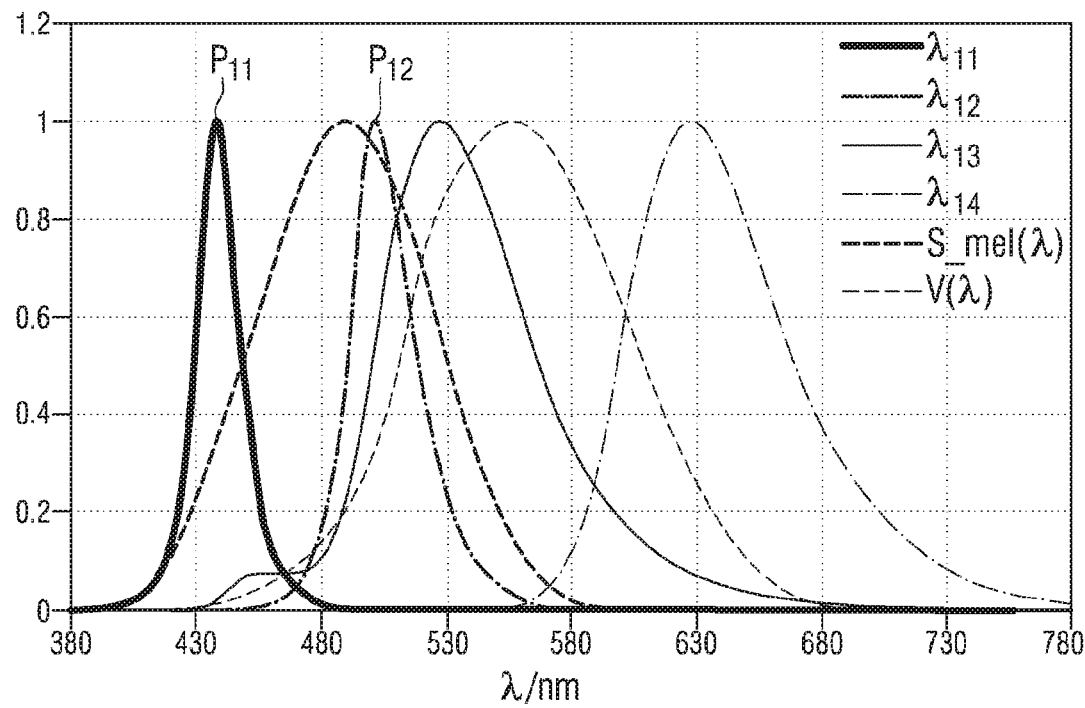

Unlike FIG. 3C, FIG. 3D describes a light-emitting component in which the fourth light source, marked by the curve $λ_{14}$, emits amber light.

Curve 4A shows the spectrum of a mixed light, for example of a light-emitting component, according to the spectrum of FIG. 3A as a curve "Mix". Furthermore, the curve of the spectrum of the mixed light p weighted with the eye sensitivity curve V(λ) is shown, and finally the curve of the mixed light m weighted with the stimulation curve $S_{mel(λ)}$ is shown.

Figure 4A:
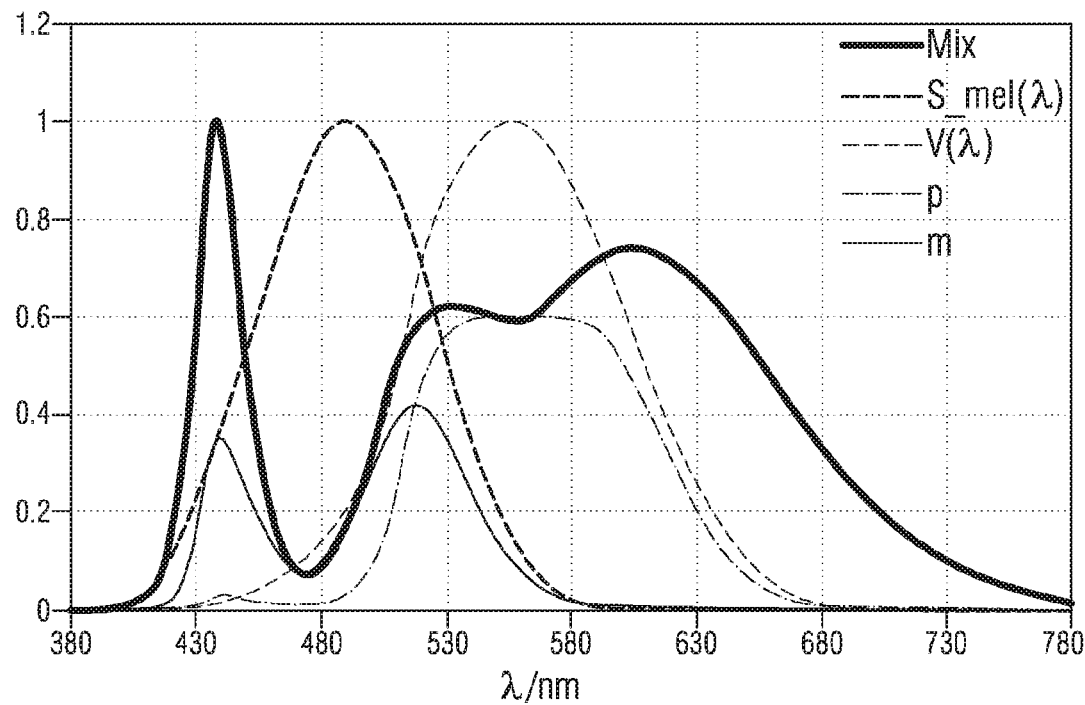

The curve Mix shown in FIG. 4A represents white mixed light with a color temperature of 4000 K and a color rendering index of 82 at an $m_{v,mel,D65}$ value of 0.54. This is achieved by operating the first light source 11 and not operating the second light source 12.

For example, the DTC value of the PWM circuit with which the light sources 1 are operated has the following values for the light sources 1:

| light source | 11 | 12 | 13 | 14 |
| --- | --- | --- | --- | --- |
| PWM DTC (%) | 26 | 0 | 68 | 100 |

The third light source 13 produces green light and the fourth light source 14 produces yellow light.

Figure 4B:
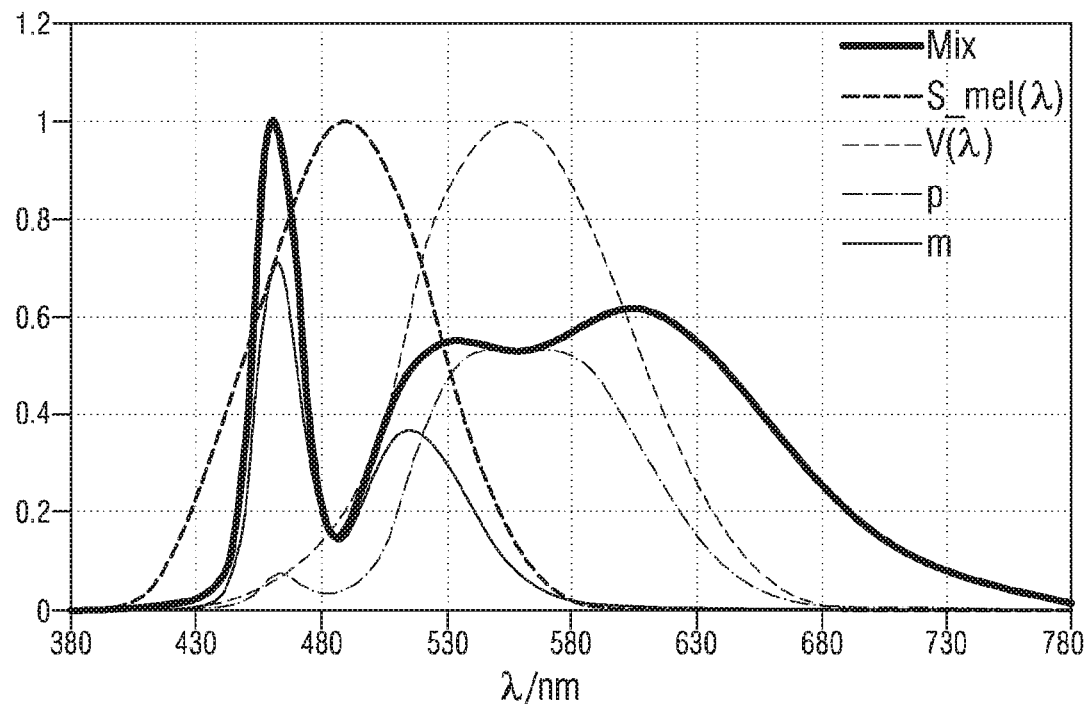

In contrast, FIG. 4B shows the spectra for white mixed light corresponding to FIG. 4A at a color temperature of 4000 K and a color rendering index of 89 at an $m_{v,mel,D65}$ value of 0.68. Here the first light source 11 is not operated and the second light source 12 is operated.

For example, the DTC value of the PWM circuit with which the light sources 1 are operated has the following values for the light sources 1:

| light source | 11 | 12 | 13 | 14 |
| --- | --- | --- | --- | --- |
| PWM DTC (%) | 0 | 22 | 67 | 100 |

With the light-emitting component described here, a maximum change in melanopsin stimulation is therefore possible. The stimulation efficiency at the same brightness is increased and an individual white point setting is possible so that the $m_{v,mel,D65}$ value can be changed without the white point shifting noticeably for the human viewer. The result is a different level of melanopsin stimulation with the same color temperature of the white mixed light. A good light mixture is achieved in particular with a narrow packing density of the light sources, for example the light-emitting diode chips of the component.

Figure 5A:
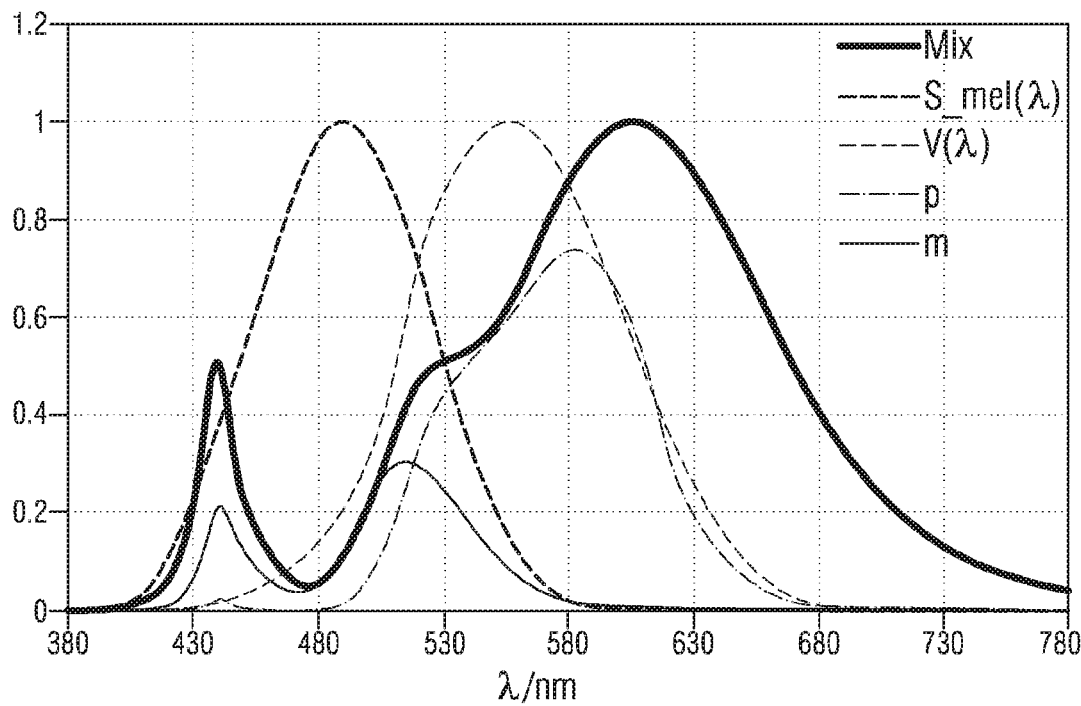

FIG. 5A shows a spectrum of mixed light for white light at a color temperature of 2700 K and a color rendering index of 81 according to the spectrum of FIG. 3A as a curve "Mix". An $m_{v,mel,D65}$ value of 0.35 is set here.

For example, the DTC value of the PWM circuit with which the light sources 1 are operated has the following values for the light sources 1:

| light source | 11 | 12 | 13 | 14 |
| --- | --- | --- | --- | --- |
| PWM DTC (%) | 15 | 0 | 39 | 100 |

Figure 5B:
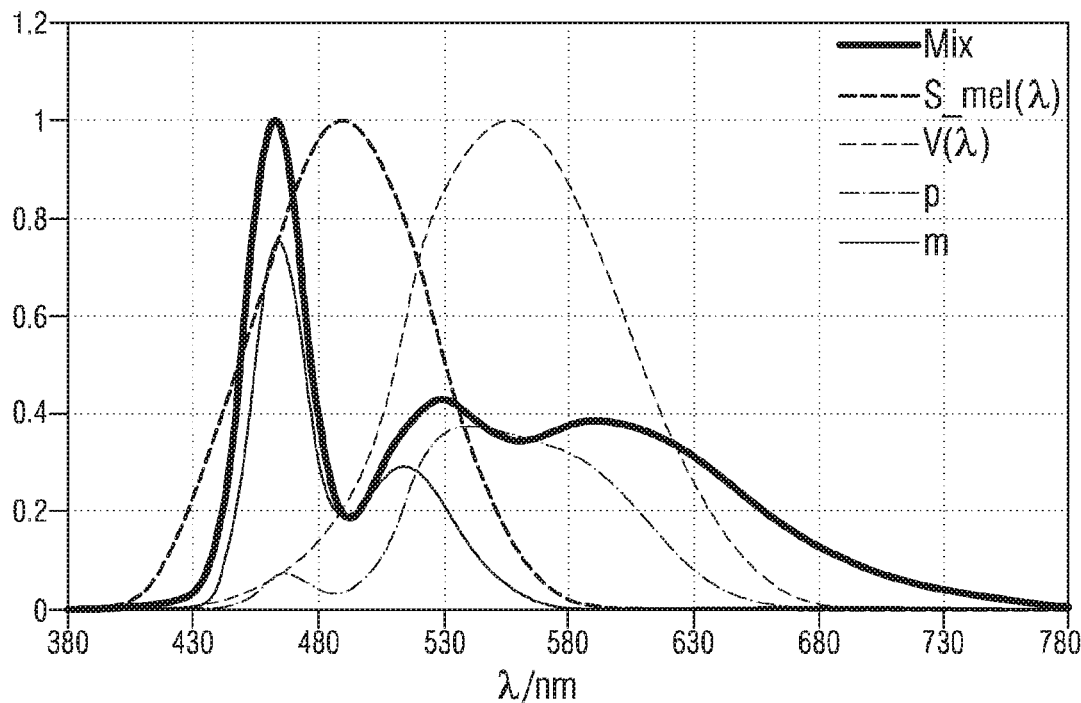

The spectrum of FIG. 5B shows white light at a color temperature of 6400 K and a color rendering index of 72. Here, an $m_{v,mel,D65}$ value of 0.99 is set.

For example, the DTC value of the PWM circuit with which the light sources 1 are operated has the following values for the light sources 1:

| light source | 11 | 12 | 13 | 14 |
| --- | --- | --- | --- | --- |
| PWM DTC (%) | 0 | 100 | 100 | 78 |

This means that in the event that the color temperature is not kept constant, it is possible with a light-emitting component described here to vary the $m_{v,mel,D65}$ value over a very wide range; in this example a dynamic factor of 2.8 is possible from the cold white light to the warm white light.

Curve 6A shows the spectrum of a mixed light, for example of a light-emitting component, according to the spectrum of FIG. 3C as a curve "Mix". Furthermore, the curve of the spectrum of the mixed light p weighted with the eye sensitivity curve V(λ) is shown, and finally the curve of the mixed light m weighted with the stimulation curve $S_{mel(λ)}$ is shown.

Figure 6A:
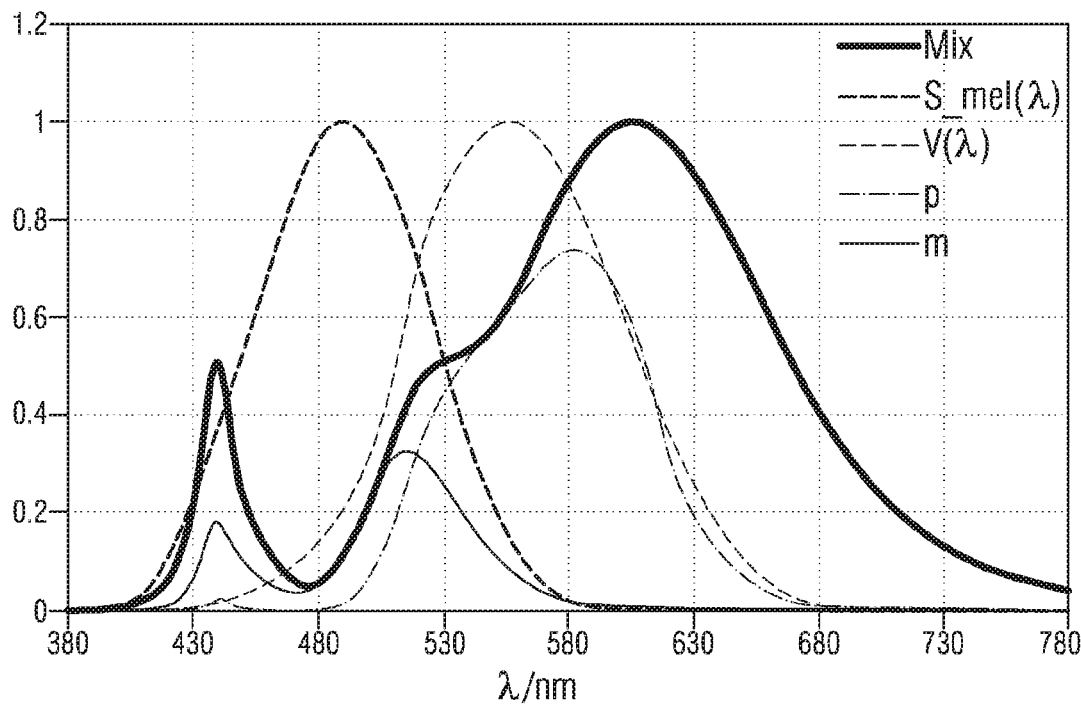

The curve Mix shown in FIG. 6A represents white mixed light with a color temperature of 2700 K and a color rendering index of 81 at an $m_{v,mel,D65}$ value of 0.35.

This is achieved by not operating the second light source 12 and operating the third light source 13.

For example, the DTC value of the PWM circuit with which the light sources 1 are operated has the following values for the light sources 1:

| light source | 11 | 12 | 13 | 14 |
|---|---|---|---|---|
| PWM DTC (%) | 8 | 0 | 35 | 100 |

The third light source 13 produces green light and the fourth light source 14 produces yellow light.

Figure 6B:
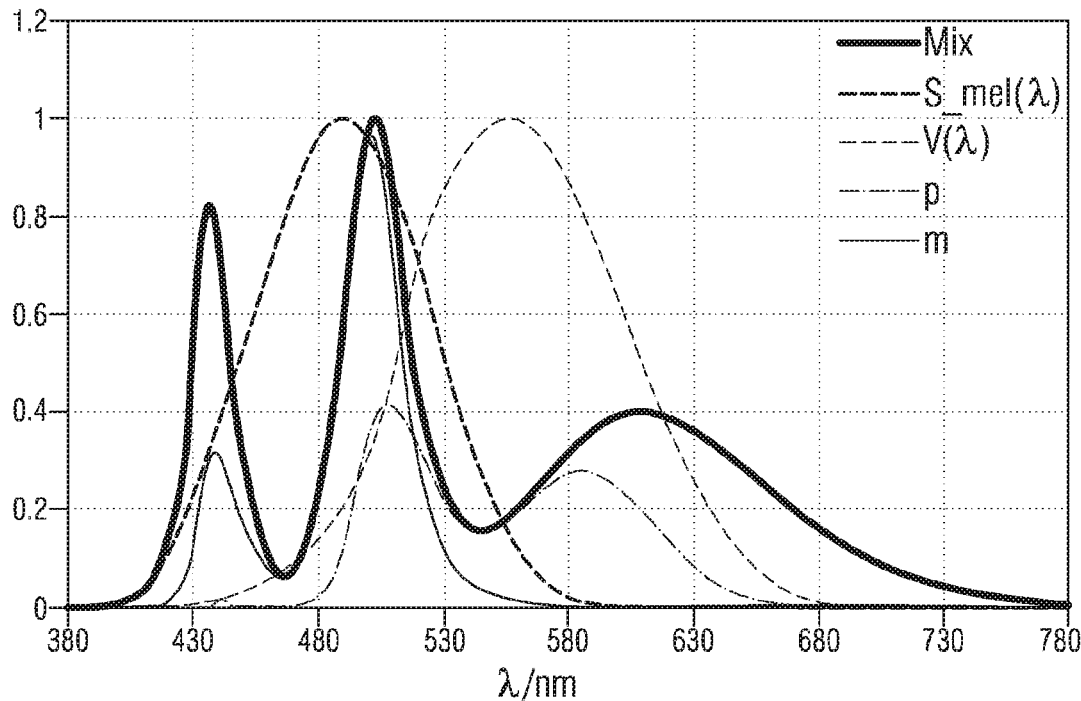

In contrast, FIG. 6B shows the spectra for white mixed light corresponding to FIG. 6A at a color temperature of 6400 K and a color rendering index of 72 at an $m_{v,mel,D65}$ value of 1.17. Here the third light source 13 is not operated and the second light source 12 is operated.

For example, the DTC value of the PWM circuit with which the light sources 1 are operated has the following values for the light sources 1:

| light source | 11 | 12 | 13 | 14 |
|---|---|---|---|---|
| PWM DTC (%) | 35 | 100 | 0 | 100 |

This means that in the event that the color temperature is not kept constant, it is possible with a light-emitting component described here to vary the $m_{v,mel,D65}$ value over a very wide range; in this example a dynamic factor of 3.3 is possible from the cold white light to the warm white light. A blue-green light source is used as the second light source.

The invention is not limited to the exemplary embodiments by the description on the basis of the same. Rather, the invention includes any new feature and any combination of features, which in particular includes any combination of features in the patent claims, even if that feature or combination itself is not explicitly mentioned in the patent claims or exemplary embodiments.

The invention claimed is:

1. A light-emitting component comprising:
   at least four light sources configured to emit light of different wavelength ranges in pairs; and
   a control device configured to:
      operate the light sources independently of one another in such a way that light from at least two of the light sources is mixed to form a mixed light; and
      adjust an $m_{v,mel,D65}$ value of the mixed light,
   wherein the at least four light sources comprise a first light source configured to emit electromagnetic radiation with a dominant wavelength of at most 450 nm, a second light source configured to emit electromagnetic radiation with a dominant wavelength of at least 480 nm and at most 520 nm or a dominant wavelength of at least 455 nm and at most 470 nm, a third light source configured to emit electromagnetic radiation in a spectral range of green light, and a fourth light source configured to emit electromagnetic radiation in a spectral range of yellow and/or amber light.

2. The light-emitting component according to claim 1, wherein the control device is configured to vary the $m_{v,mel,D65}$ value of the mixed light in a predefinable range, wherein a color temperature of the mixed light at different $m_{v,mel,D65}$ values from the predefinable range varies by at most 20% about an average value.

3. The light-emitting component according to claim 1, wherein, in order to produce mixed light with a higher $m_{v,mel,D65}$ value, the first light source is operated with a lower power in comparison to the second light source than for a lower $m_{v,mel,D65}$ value.

4. The light-emitting component according to claim 3, wherein the first light source is not operated and the second light source is operated in order to produce mixed light with the higher $m_{v,mel,D65}$ value, and the second light source is not operated and the first light source is operated in order to produce mixed light with the lower $m_{v,mel,D65}$ value.

5. The light-emitting component according to claim 1, wherein, in order to produce mixed light with a higher $m_{v,mel,D65}$ value, the third light source is operated with a lower power in comparison to the second light source than for a lower $m_{v,mel,D65}$ value.

6. The light-emitting component according to claim 5, wherein the third light source is not operated and the second light source is operated in order to produce mixed light with the higher $m_{v,mel,D65}$ value, and the second light source is not operated and the third light source is operated in order to produce mixed light with the lower $m_{v,mel,D65}$ value.

7. The light-emitting component according to claim 1, wherein a luminous flux of the mixed light is at least 500 lm.

8. A lamp comprising:
   at least one light-emitting component according to claim 1,
   wherein the lamp is configured to emit light having a luminous flux of at least 500 lm.

9. The lamp according to claim 8, wherein the lamp is configured for general lighting or for lighting the interior of a means of transport.

10. The lamp according to claim 9, wherein the means of transport is a motor vehicle, a bus, a railway wagon, an aircraft, a boat, a submarine, or a helicopter.

11. A light-emitting component comprising:
   at least four light sources configured to emit light of different wavelength ranges in pairs; and
   a control device configured to:
      operate the light sources independently of one another in such a way that the light from at least two of the light sources is mixed to form a mixed light;
      adjust an $m_{v,mel,D65}$ value of the mixed light; and
      vary the $m_{v,mel,D65}$ value of the mixed light in a predefinable range,
   wherein a color temperature of the mixed light at different $m_{v,mel,D65}$ values from the predefinable range varies by at most 20% about an average value.

* * * * *